(12) United States Patent
Cote et al.

(10) Patent No.: US 7,170,938 B1
(45) Date of Patent: Jan. 30, 2007

(54) RATE CONTROL METHOD FOR VIDEO TRANSCODING

(75) Inventors: Guy Cote, Elora (CA); Lowell Winger, Waterloo (CA); Michael Gallant, Guelph (CA)

(73) Assignee: Cisco Systems Canada Co., Halifax (CA)

( * ) Notice: Subject to any disclaimer, the term of this patent is extended or adjusted under 35 U.S.C. 154(b) by 733 days.

(21) Appl. No.: 09/934,975

(22) Filed: Aug. 21, 2001

(51) Int. Cl.
*H04N 7/12* (2006.01)
(52) U.S. Cl. .................................. 375/240.03
(58) Field of Classification Search ............................... 375/240.01–240.07, 240.12–240.16, 240.23, 375/240.28
See application file for complete search history.

(56) References Cited

U.S. PATENT DOCUMENTS

| | | | |
|---|---|---|---|
| 5,493,456 A | 2/1996 | Augenbraun et al. | |
| 5,570,197 A | 10/1996 | Boon | |
| 5,751,701 A | 5/1998 | Langberg et al. | |
| 5,754,235 A | 5/1998 | Urano et al. | |
| 5,812,786 A | 9/1998 | Seazholtz et al. | |
| 6,026,097 A | 2/2000 | Voois et al. | |
| 6,181,711 B1 | 1/2001 | Zhang et al. | |
| 6,208,688 B1 | 3/2001 | Seo et al. | |
| 6,226,326 B1 * | 5/2001 | Mihara ................... | 375/240.05 |
| 6,310,915 B1 * | 10/2001 | Wells et al. ............ | 375/240.03 |
| 6,441,754 B1 * | 8/2002 | Wang et al. ................... | 341/50 |
| 6,587,508 B1 * | 7/2003 | Hanamura et al. ...... | 375/240.24 |
| 6,904,094 B1 * | 6/2005 | Liu et al. ................ | 375/240.13 |
| 2001/0008544 A1 * | 7/2001 | Ishiyama ................ | 375/240.12 |

FOREIGN PATENT DOCUMENTS

| | | |
|---|---|---|
| EP | 0 103 438 B1 | 7/1986 |
| GB | 2 061 581 A | 5/1981 |
| GB | 2 118 750 A | 11/1983 |
| GB | 2 286 277 A | 8/1995 |
| GB | 2 288 044 A | 10/1995 |
| IT | 1 523 753 | 9/1978 |
| WO | WO 87/06416 | 10/1987 |

OTHER PUBLICATIONS

A.R. Reibman, B.G. Haskell, "Constraints on Variable Bit-Rate Video for ATM Networks", IEEE Transactions on Circuit and Systems for Video Technology, vol. 2, No. 4, Dec. 1992, pp. 361-372.

(Continued)

*Primary Examiner*—Mehrdad Dastouri
*Assistant Examiner*—Dave Czekaj
(74) *Attorney, Agent, or Firm*—Beyer Weaver & Thomas, LLP (57) ABSTRACT

The present invention discloses a system and method for rate control of MPEG video streams to achieve a target bit rate in a transcoder at the best visual quality possible. The invention monitors video buffer fullness for selecting the amount of rate reduction necessary to achieve a target bit rate. The invention also utilizes a method for selective requantization of DCT coefficients to assure visual quality.

9 Claims, 8 Drawing Sheets

OTHER PUBLICATIONS

G. Keesman, R. Hellinghuizen, F. Hoeksema, G. Heideman, "Transcoding of MPEG bitstreams", Signal Processing: Image Communication, vol. 8 (1996), pp. 481-500.

J. Lee and B.W. Dickinson, *Scene-Adaptive Motion Interpolation Structures Based on Temporal Masking in Human Visual Perception*, in Proc. SPIE Conf. Visual Communication and Image Processing, Cambridge, Nov. 1993, pp. 499-510.

J. Lee and B.W. Dickinson, *Adaptive Frame Type Selection for Low Bit-Rate Video Coding*, in Proc. SPIE Conf. Visual Communication and Image Processing, Chicago, IL, Sep. 1994, pp. 1411-1422.

A.Y. Lan, A.G. Nguyen and J.N. Hwang, *Scene-Content-Dependent Reference-Frame Placement for MPEG Video Coding*, IEEE Trans. Circuits and Systems Video Technol., vol. 9, No. 3, pp. 478-89, 1999.

A. Yoneyama, Y. Nakajima, H. Yanagihara and M. Sugano, *MPEG Encoding Algorithm with Scene Adaptive Dynamic GOP Structure*, IEEE Third International Workshop on Multimedia Signal Processing, pp. 297-302, 1999.

ISO/IEP *Information Technology-Generic Coing Of Moving Pictures And Associated Audio Information: Video*, ISO.IEC 13818-2, 1995, 209 pages.

* cited by examiner

RATE CONTROL METHOD FOR VIDEO TRANSCODING

FIELD OF THE INVENTION

The present invention relates generally to systems and methods for the compression of digital images. More specifically, the present invention relates to reducing the video bit rate of an MPEG stream to accurately produce a constant bit rate stream from an encoded video stream.

BACKGROUND OF THE INVENTION

Creating a high definition digital image requires a large amount of data. As stated by John Wiseman in *An Introduction to MPEG Video Compression;*

> One of the formats defined for HDTV broadcasting within the United States is 1920 pixels horizontally by 1080 lines vertically, at 30 frames per second. If these numbers are all multiplied together, along with 8 bits for each of the three primary colors, the total data rate required would be approximately 1.5 Gb/sec. Because of the 6 MHz channel bandwidth allocated, each channel will only support a data rate of 19.2 Mb/sec, which is further reduced to 18 Mb/sec by the fact that the channel must also support audio, transport, and ancillary data information. As can be seen, this restriction in data rate means that the original signal must be compressed by a figure of approximately 83:1.

Although this is only a single example of a specific format, it serves to illustrate that compressing digital images is an area of great interest to those who provide digital transmissions.

Throughout the specification and claims, we will be using the term MPEG (Motion Picture Expert Group). MPEG is a generic reference to a family of international standards, which define how to encode visual and audio information in a digital compressed format. MPEG is utilized in a wide variety of applications, including DVD (Digital Video Discs) and DVB (Digital Video Broadcasting).

The MPEG standards specify exactly the format in which the compressed data is to be transmitted. A key feature of MPEG is that it can compress a video signal into a fraction of its original size. MPEG achieves a high compression for video by storing only the changes from one video frame to another, instead of each entire frame. This compression process is known as encoding and is done by an encoder. At the receiving end of an MPEG transmission, there exists a decoder, which decodes the transmission and restores it as best it can to the video signal originally encoded.

There are two major MPEG standards: MPEG-1 and MPEG-2.The most common implementations of the MPEG-1 standard provide video quality slightly below the quality of conventional VCR (Video Cassette Recorder) videos. MPEG-2 provides higher resolution, with full CD quality audio. This is sufficient for the major TV standards, including NTSC (National Standards Television Committee) and HDTV (High Definition Television).

Of the series of MPEG standards that describe and define the syntax for video broadcasting, the standard of relevance to the present invention is ISO/IEC IS 13818-2, ITU-T Recommendation H.262, titled "Generic coding of moving frames and associated audio information: Video," which is incorporated herein by reference and is hereinafter referred to as "MPEG-2".

An MPEG video transmission is essentially a series of pictures taken at closely spaced time intervals. Often a picture may be quite similar to the one that precedes it or the one that follows it. For example, video of waves washing up on a beach would change little from picture to picture. Except for the motion of the waves, the beach and sky would be largely the same. Once the scene changes, however, some or all similarity may be lost. The concept of compressing the data in each picture relies upon the fact that many images do not change significantly from picture to picture. Thus, considerable savings in data transmission can be made by transmitting only the differences between pictures, as opposed to the entire picture. In the MPEG-2 standard a picture is referred to as a "frame". This is terminology we will use from now on.

If an MPEG-2 stream is to be viewed immediately as it is received, the communication channel must have enough bit rate capacity to provide the series of frames at a real-time rate. Bit rate is the number of digital bits which a communication channel can transmit per second. Alternatively, frames can be encoded to a size suitable for a channel of a given bit rate. MPEG-2 encoding allows the size of each frame to be adjusted by varying quality, thus smaller frames may be achieved at the expense of lower quality. The objective of an MPEG-2 encoding scheme is to maximize quality for the available bit rate.

Consider a system in which high-quality MPEG-2 video is to be played directly from a storage medium; DVD is an example. The video quality is high, as instantaneous bit rate is of relatively low concern. Consider now that the stored high-quality video is to be communicated across a channel of constrained bit rate such as a telephone line. Some device must re-encode each frame (with potential reduction of quality) so the sequence of frames may be transmitted in real time within the available bit rate. Such a device is known as a transcoder. A transcoder converts an encoded bit stream of one bit rate to a lower bit rate, and in doing so, changes the content of the encoded bitstream.

MPEG-2 video produces a variable bit rate stream. Therefore, a buffer between the transcoder and the decoder is necessary to achieve a constant bit rate transfer. The size of the buffer will determine the frame size variation allowable. Consequently, an MPEG-2 transcoder must monitor buffer fullness and control the bit rate of each frame to avoid buffer underflow and/or overflow.

Methods for achieving rate reduction already exist. One such example is the method disclosed in U.S. Pat. No. 6,208,688, which makes use of a method known as requantization. The, 6,208,688 patent does not consider video transcoder buffers, which are necessary to achieve constant bit rate operation of an MPEG-2 video transcoder. Further, because it addresses only bit rate it fails to consider image quality. By doing so, the choice of a particular requantization step size to achieve a target bit rate may produce a bit stream with worse image quality than that of a lower bit rate stream.

Precisely achieving a target bit rate while maintaining good video quality in a transcoder presents many challenges. There is a need for a simple rate control method in a transcoder which monitors the video buffers to avoid underflow/overflow, and achives a target bit rate at the best possible image quality. The present invention addresses this need.

SUMMARY OF THE INVENTION

The present invention relates to a system and method for rate control of MPEG video streams to achieve a target bit rate in a transcoder.

One aspect of the present invention is a transcoder, the transcoder containing:
a) a frame buffer;
b) an encoder receiving input from the frame buffer;
c) a vbv buffer receiving input from the encoder;
d) a channel interface receiving input from the vbv buffer;
e) a channel rate control connected to the vbv buffer and the channel interface; and
f) a transcoder rate control connected to the frame buffer, the encoder, the vbv buffer and the channel rate control.

In another aspect of the present invention there is provided a method of controlling the rate of an MPEG video stream to achieve a target bit rate, the method having the steps of:
a) computing a rate reduction factor;
b) computing a quantizer scale;
c) applying the results of steps a) and b) to an encoder to achieve the target bit rate; and
d) repeating steps a) to c) for a plurality of frames in the video stream.

In another aspect of the present invention there is provided a video encoding system, the system accepting as input a source stream and outputting a modified stream, the system having means to determine the amount of rate reduction necessary to achieve a target bit rate for the modified stream.

In another aspect of the present invention, there is provided a computer readable medium containing instructions for controlling the rate of an MPEG video stream to achieve a target bit rate, the instructions performing the steps of:
a) computing a rate reduction factor;
b) computing a quantizer scale;
c) applying the results of steps a) and b) to an encoder to achieve the target bit rate; and repeating steps a) to c) for a plurality of frames in the video stream.

In yet another aspect of the present invention there is provided a system for controlling the rate of an MPEG video stream to achieve a target bit rate, the system having:
a) means for computing a rate reduction factor;
b) means for computing a quantizer scale;
c) means for applying the results of steps a) and b) to an encoder to achieve said target bit rate.

BRIEF DESCRIPTION OF THE DRAWINGS

For a better understanding of the present invention, and to show more clearly how it may be carried into effect, reference will now be made, by way of example, to the accompanying drawings which aid in understanding a preferred embodiment of the present invention and in which.

DETAILED DESCRIPTION OF THE PREFERRED EMBODIMENTS

The transmission and reception of digital video signals requires complex hardware and software components. It is not the intent of this disclosure to address all such components but rather to address the specific areas within a digital video system in which the present invention may be utilized.

Figure 1:
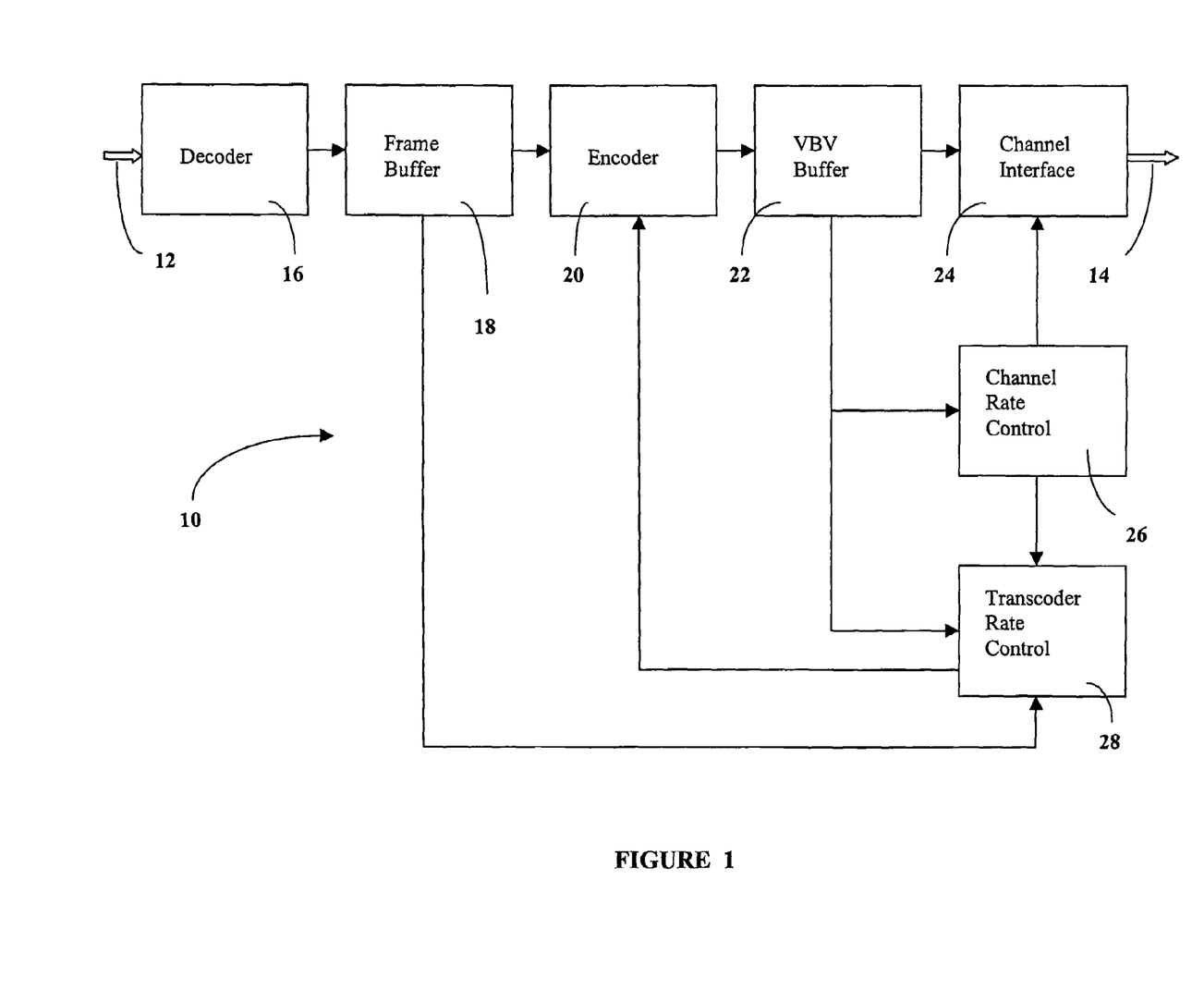
FIG. 1 is a block diagram of a transcoder.

Referring now to FIG. 1, a block diagram of a transcoder is shown generally as 10. Source stream 12 provides the input to transcoder 10. For the purpose of simplicity the reader may think of source stream 12 as a high bit rate MPEG-2 stream from a DVD. However, it is not the intent of the inventors to restrict stream 12 to the format that is defined within the MPEG-2 standard, or to a specific source. Transcoder 10 receives source stream 12 and through a series of steps converts stream 12 to reformatted stream 14. The intent of creating reformatted stream 14 is to reduce the amount of data to be transmitted to an end user. As an example, reformatted stream 14 may be sent to a settop television box, where stream 14 is decoded and displayed to the user as a movie.

We shall now discuss how source stream 12 becomes reformatted stream 14 with reference to FIG. 1. Source stream 12 prior to being received by video decoder 16 will have been encoded to reduce the amount of data transmitted. Decoder 16 decodes source stream 12 to restore it to the format of its original source. The decoded stream is then passed to Frame Buffer 18 which stores the decoded stream and serves it frame by frame to encoder 20 as requested by encoder 20. Encoder 20 encodes the data received from frame buffer 18 based upon the input provided by transcoder rate control 28. Transcoder rate control 28 serves to regulate the amount of data flowing from encoder 20 to Video Buffer Verifier (VBV) 22. Transcoder 28 does this by monitoring the fullness of frame buffer 18 and VBV buffer 22. VBV buffer 22 serves as temporary storage for the output from encoder 20 until the encoded data is passed to channel interface 24. Channel interface 24 is an interface to any type of communications medium, for example: satellite transmission, wireless transmission, coaxial cable, twisted pair, internal computer bus or any other form of transmitting data. Channel interface 24 transmits reformatted data stream 14 at an optimal rate for the channel upon which reformatted data stream 14 will be transmitted. Channel rate control 26 serves to regulate the data passing from VBV buffer 22 to channel interface 24 based upon a predetermined target bit rate and informs transcoder rate control 28 of the target bit rate so that transcoder rate control 28 may utilize that value in providing rate control instructions to encoder 20.

As one skilled in the art will recognize, video decoder 16 and encoder 20 may be one of many different embodiments standard to the video communication industry.

To better understand the present invention, we will provide a brief and simplistic overview of how digital images are stored, compressed and transmitted.

There are basic forms of compression for a frame in a video stream, interframe and intraframe. interframe compresses data based upon similarities between frames (thus "inter"), while intraframe compresses data based upon similarity within a region of a single frame (thus "intra"). As with our earlier wave example, intraframe compression can take advantage of the fact that much of the sand on the beach is quite similar within regions of the frame. Similarly interframe compression can make use of the fact that the scene on a beach may not change that often.

The frames of an MPEG video sequence are of three different types: I, P and B. I frames are intra-coded frames and are coded independently, without reference to the other frames. P-frames are predictive-coded frames, which predict content based upon preceding I or P-frames. B-frames are bidirectionally predictive-coded frames. B-frames may predict content based upon immediately preceding or following I or P-frames, thus the use of the term "bidirectional".

Figure 2:
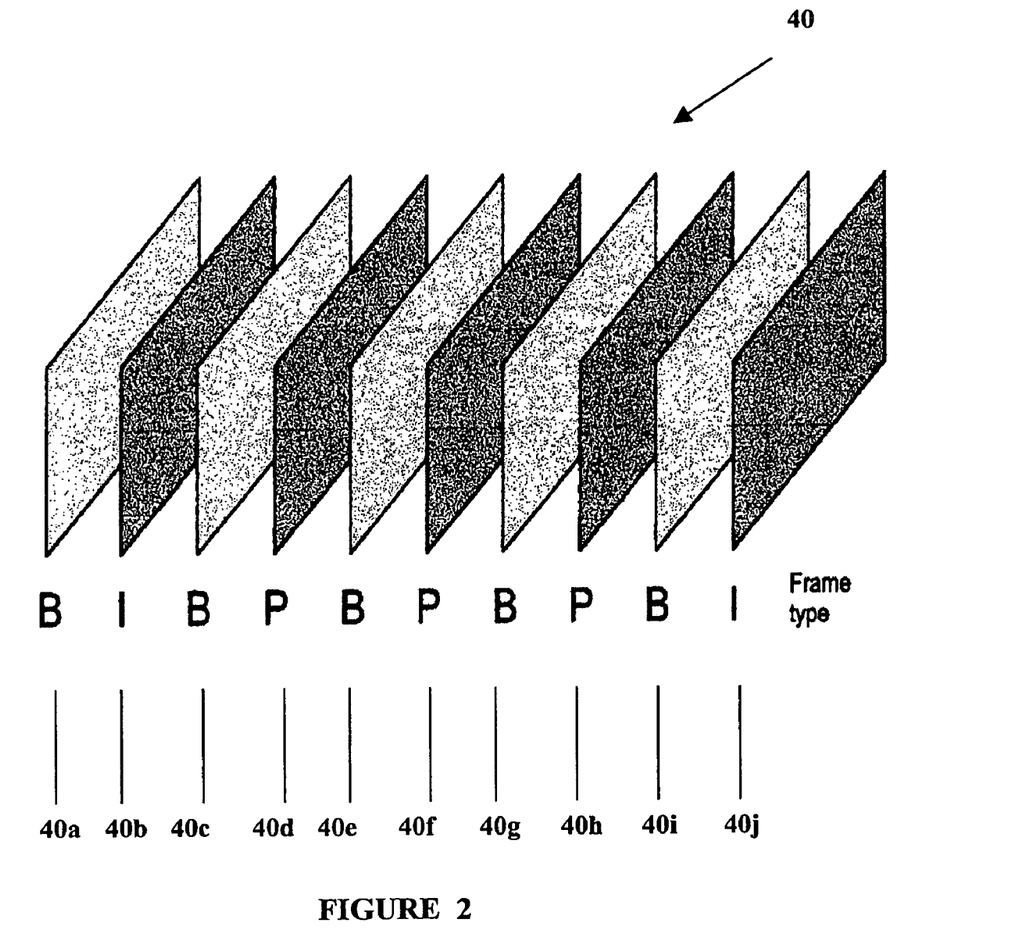
FIG. 2 is a schematic diagram of a group of frames in an MPEG video sequence.

FIG. 2 is a schematic diagram of a group of frames in an MPEG video sequence, shown generally as 40. Frames 40a to 40j are of different types, namely I, P and B. Frames 40a to 40j are shown in the order in which they would be displayed to a user. However, due to the requirement that P and B frames require information from other frames, the transmission order is actually: 40b, 40a, 40d, 40c, 40f, 40e, 40h, 40g, 40j, and 40i. For example, frame 40i being a bidirectional frame cannot be transmitted until the differences in frames 40h and 40j have identified.

Referring back to our example of waves on a beach, imagine we are looking at waves washing up on the beach from a stationary camera and the sky has only motionless clouds. The only thing moving are the waves. In such a scene, an encoder providing source stream 12 (see FIG. 1) would create an I-frame which is transmitted to decoder 16. Decoder 16 ultimately passes the image on to stream 14 whereupon it is transmitted to and displayed to a user. Decoder 16 retains a copy of the information contained in that image, within frame buffer 18. Next, the encoder (not shown) providing source stream 12 generates a P-frame based on the motion of the waves. It generates a frame that has the identical background of the proceeding I-frame. The waves have moved a little. The encoder providing source stream 12, using complex mathematics, compares the image it has predicted with the actual image. The encoder providing source stream 12 then transmits data that represents this comparison, not the entire image. Decoder 16 utilizes the same complex mathematics. For decoder 16 to determine what the next frame should look like, it only needs to know the error between the prediction and the actual image to recreate the P-frame.

Should the scene change to a close up of a surfer on the beach, the image will have changed completely. This throws off the prediction process and requires an entirely new image, thus the process starts again.

It is not the intent of the present disclosure to provide in detail the steps of the prediction process, as they are well known in the art.

The basic building block of an MPEG frame is a macroblock. A macroblock consists of a 16×16 array of luminance (grayscale) pixels together with two 8×8 blocks for chrominance (colour) pixels. It is not the intent of this disclosure to discuss the technical details of the information in a macroblock as it is well known to those skilled in the art and well defined in the MPEG-2 standard. At the introductory level, one may consider a macroblock to be a digital equivalent of a portion of the analog RGB (red, green, blue) information transmitted in video source signal, before that signal is encoded to become source stream 12.

We will now describe the method used to determine the amount of rate reduction necessary to achieve the target bit rate. The reader may wish to refer to Appendix 1, which is a descriptive list of the variables referred to in this specification.

1. Rate Reduction Factor

The rate reduction factor, rate_reduction_factor, is the factor by which the current frame size is multiplied to obtain a frame size necessary to meet the target_bit_rate and thus to avoid underflow of VBV buffer 22. A rate_reduction_factor value of 100 means 100% of the frame size is retained (i.e. no reduction). A value of 60 means that a 60% of the frame size is retained, thus a 40 percent reduction is required. The value of rate_reduction_factor is estimated from the sizes of future frames coming from frame buffer 18, and the current fullness of VBV buffer 22, which are both monitored by transcoder rate control 28.

Frame buffer 18 contains decoded frames and associated "side information" which is passed to encoder 20. Side information used by transcoder rate control 28 includes the number of bits in the current frame. Side information also includes the display duration of the current frame, for example 1/30 second at a frame rate of 30 frames per second. The number of frames stored in frame buffer 18 is the value stored in the variable window_size.

Transcoder rate control 28 monitors the fullness of VBV buffer 22. The maximum size of VBV buffer 22 in bits, vbv_size, is determined from vbv_buffer_size as follows:

$$vbv\_size=16*1024*vbv\_buffer\_size$$

vbv_buffer_size is an 18-bit integer, the lower 10 bits are in the vbv_buffer_size_value in the sequence_header and the lower 8 bits are in the vbv_buffer_size_extension in the sequence_extension. Both of the structures sequence_header and sequence_extension are defined in MPEG-2.

The value vbv_bits represents the number of bits present in VBV buffer 22 when the current frame is being processed by encoder 20. The value of vbv_bits is initialized such that VBV buffer 22 is halfway full, i.e., vbv_bits vbv_size/2. The value of vbv_bits is updated after every frame is processed by encoder 20 and sent to VBV buffer 22. Lower and upper limits on vbv_bits, vbv_lower_limit and vbv_upper_limit, respectively, are first initialized. These values allow for a certain margin of error for encoder 20 in setting frame sizes (i.e. the amount of data transmitted per frame). For example, vbv_lower_limit could be 10% of vbv_size, and vbv_upper_limit could be set to 90% of vbv_size. The value target bit rate is the bit rate in bits/second that is desired between VBV buffer 20 and channel interface 24. The value of channel_bit_rate is the bit rate at which the reformatted stream 14 is transmitted by channel interface 24. The value of channel_bit_rate is always less or equal to target_bit_rate.

The rate reduction necessary to avoid underflow and/or overflow of VBV buffer 22 for the target_bit_rate is distributed among the frames stored in frame buffer 18, and stored in the variable rate_reduction_factor.

The value of rate_reduction_factor is set to avoid underflow of VBV buffer 22. Conversely, the value of rate_increase is the percentage by which rate_reduction_factor should be increased to avoid overflow of VBV buffer 22. The values of rate_reduction_factor and rate_increase are dependent upon each other. For example, an increase in the value of rate_reduction_factor would result in a decrease in rate_increase. Similarly, a decrease in the value of rate_reduction_factor would result in an increase in the value of rate_increase.

Transcoder rate control 28 looks ahead to frame buffer 18, to ensure that decoder 16 is delayed by window_size, with respect to encoder 20. Transcoder rate control 28 distributes the rate_reduction_factor among frames in the window_size. The use of rate_increase is necessary in the case where the rate_reduction_factor would reduce the size of early frames or large later frames by an amount that would cause the VBV to overflow. This is to say that if very large frames are present in frame buffer 18, transcoder rate control 28 will try to reduce the size of earlier frames, and if these frames are small, VBV buffer 22 might overflow. The values of rate_reduction_factor and rate_increase are both initialized to zero (i.e., no change in bit rate). The size of each frame in frame buffer 18 is summed to create the value stored in total_sizes. The value of sizes[i] is the size in bits of frame[i]. The value of sizes[window_size-1] is the size of the frame to be encoded next. The value in sizes [0] is the size of the frame to be encoded in (window_size-1) frames. The value of total_sizes is weighted by the value of rate_reduction_factor to distribute the value of rate reduction factor of future frames to earlier frames.

The value stored in total_delays is the sum of the time duration of the number of frames stored in window_size frames. The value of total delays depends upon the size of frame as well as the frame duration. The value of frame duration for a frame "i" is stored in delays[i]. Frame duration is typically the time a frame will ultimately be displayed to the end user, e.g. 1/30 of a second. Frame duration may vary. For example, a commercial may be inserted into the stream with a different duration, for example 1/25 of a second.

The fullness of the VBV buffer 22, vbv_bits, is computed based on target_bit_rate, total_delays and the previous value of vbv_bits. The value of rate_reduction_factor is set to make sure VBV buffer 22 does not underflow, and rate_increase is set to make sure VBV buffer 22 does not overflow.

The following is the pseudo-code to determine rate_reduction_factor and rate_increase:

```
for (i= window_size-1; i>=0; i--)
{
    total_sizes += (sizes[i] *
        (100 - rate_reduction_factor))/100;
    total_delays += delays[i];
    vbv_bits = vbv_bits + total_sizes -
        total_delays * target_bit_rate;
    if (vbv_bits < vbv_lower_limit)
    {
        rate_reduction_factor +=
            (100 - rate_reduction_factor) *
            (vbv_lower_limit - vbv_bits)
            /(vbv_lower_limit*(window_size - i + 1));
    }
    if (vbv_bits > vbv_upper_limit)
    {
        rate_increase += (100 - rate_increase) *
            (vbv_bits - vbv_upper_limit) /
            (vbv_lower_limit*(window_size - i + 1));
    }
}
```

The next step is to calculate rate reduction factor for the current frame based upon the current values of rate_reduction_factor and rate_increase. A new value of rate_reduction_factor is set only if the incoming frames to VBV buffer 22 are too large and bit rate reduction is necessary. If no change to the value of rate_reduction_factor is necessary (i.e. vbv_bits is greater than vbv_upper limit), then channel_bit_rate is lowered to keep the content of VBV buffer 22 below vbv_upper_limit. Otherwise channel_bit_rate is increased to stay close to the vbv_upper_limit. This allows transcoder rate control 28 to reserve space in VBV buffer 22 and minimize the change to rate_reduction_factor necessary to avoid underflow in future frames.

An additional check ensures that the maximum channel_bit_rate is always less or equal to target_bit_rate. The following is the pseudo-code for this step:

```
if (rate_reduction_factor - rate_increase > 0)
{
    rate_reduction_factor = 100 - rate_reduction_factor
        + rate_increase;
}
else
{
    rate_reduction_factor = 100;
    if (vbv_bits > vbv_upper_limit)
    {
        channel_bit_rate -=
            (vbv_bits - vbv_upper_limit) *
            (channel_bit_rate / vbv_size);
    }
    else
    {
        if (vbv_bits < (vbv_size - 2 *
            vbv_upper_limit))
        {
            channel_bit_rate +=
                (vbv_upper_limit - vbv_bits) *
                channel_bit_rate/vbv_size;
            if (channel_bit_rate > target_bit_rate)
            {
                channel_bit_rate = target_bit_rate;
            }
        }
    }
}
```

After the current frame is encoded by encoder 20 and sent to VBV buffer 22, and the exact number of bits used for the frame, frame_size, and the duration of the frame (frame_delay), are known, vbv_bits is updated as follows:

vbv_bits+=frame_size-
    frame_delay*channel_bit_rate;

Encoder 20 also sets the value of the vbv_delay in the picture header, as defined in the MPEG-2 standard, of the MPEG-2 bit stream output by channel interface 24 to be:

vbv_delay=(90000*vbv bits)/channel_bit rate

This equation is specified in the MPEG-2 standard for constant bitrate operation. The value of 90,000 is based upon the use of a 90 kHz clock utilized by VBV buffer 22 to time ingoing and outgoing data.

Figure 3:
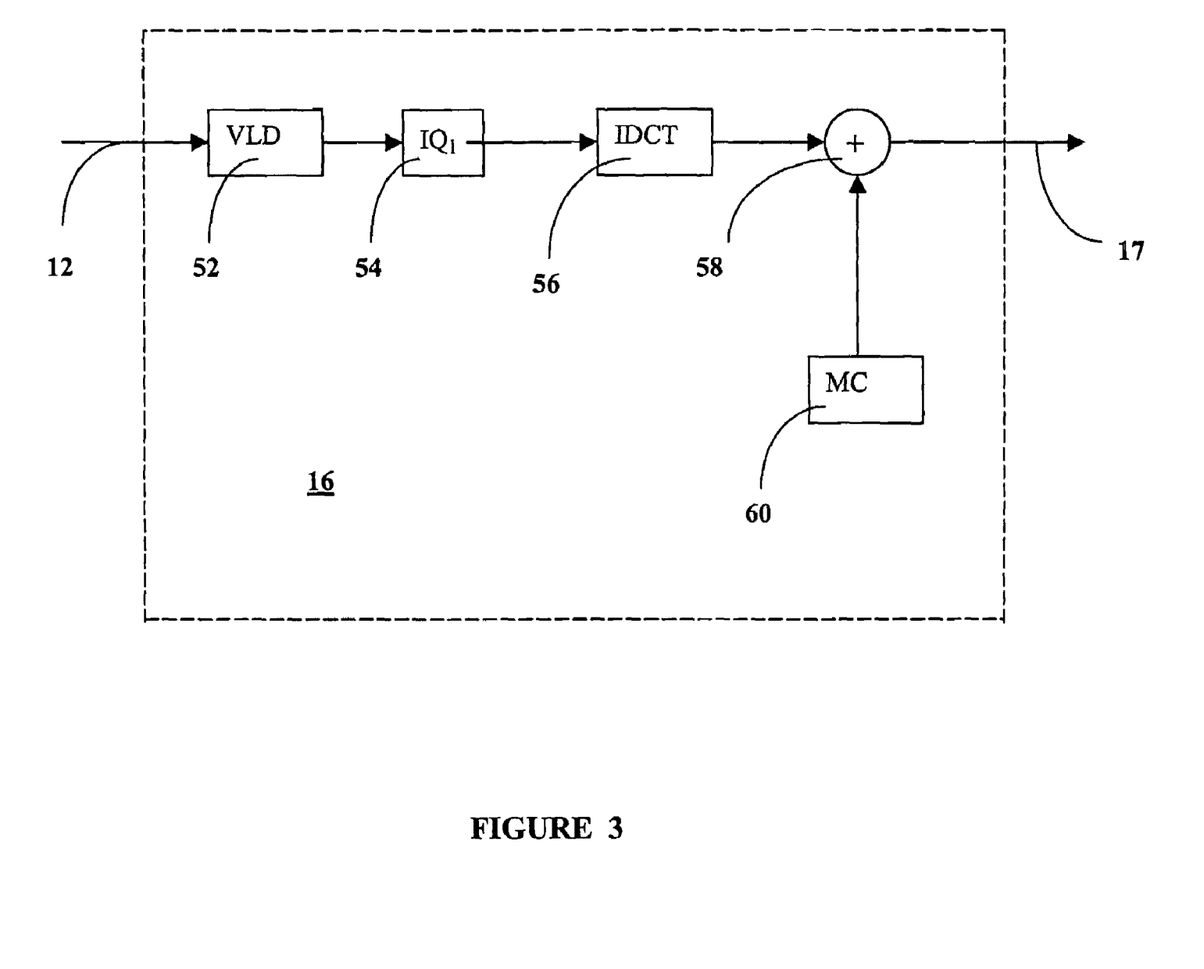
FIG. 3 is a schematic diagram of a decoder.

We now refer to FIG. 3 a schematic diagram of an implementation of video decoder 16. Source stream 12 is received by Variable Length Decoder module 52. Variable Length Decoder 52 decodes stream 12 and passes it to Inverse Quantizer module 54. Inverse Quantizer 54 inverts the quantization process originally applied to source stream 12 and passes the modified stream to Inverse Discrete Cosine module 56. Module 56 inverts the Discrete Cosine Transform originally applied to source stream 12. Motion Compensated module 60 then provides picture difference information that is added at block 58 to produce decoded video stream 17.

With regard to the above description of FIG. 3, it is not the intent of the inventors to describe in detail the functionality of modules 52, 54, 56, 58 and 60. The functionality expected of such modules is defined in the MPEG-2 standard and numerous variations of decoders 16 have been published and are well known to those skilled in the art. As one skilled in the art will recognize, any number of variations of decoder 16 may be utilized within the scope of the present invention as claimed. FIG. 3 serves only to illustrate one example of a decoder 16.

Figure 4:
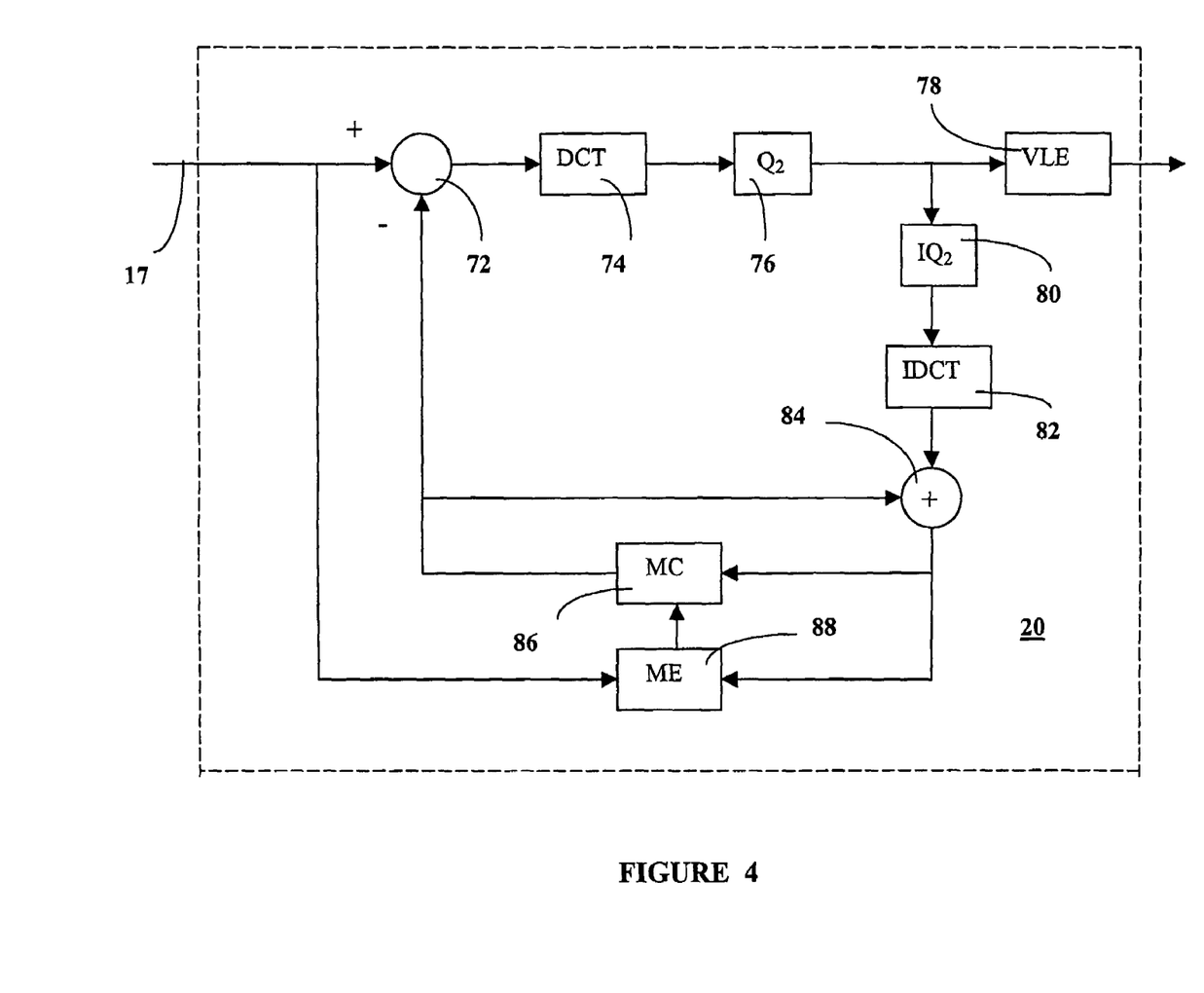
FIG. 4 is a schematic diagram of an encoder.

Referring now to FIG. 4, there is shown a schematic diagram of an implementation of an encoder 20. Decoded video stream 17 is input to encoder 20. Module 72 subtracts motion compensated prediction from the current frame to form a "prediction error" frame. The prediction error frame is passed to Discrete Cosine Transform module 74, which transforms the frame and passes it to Quantizer module 76. Quantizer module 76 quantizes the coefficients produced by module 74 and creates a new frame. The new frame may have to be recalculated based upon prediction error, thus the reason for the loop comprising blocks 80, 82, 84, 86 and 88. Motion compensation module 86 and motion estimation module 88 utilize the motion vectors present in stream 17 to create the data necessary to form a P or B frame.

Once a frame has been successfully encoded it is passed to Variable Length Encoder module 78. Module 78 then transmits the reformatted stream to a channel.

With regard to the above description of FIG. 4, it is not the intent of the inventors to describe in detail the functionality of the modules shown. The functionality expected of such modules is defined in the MPEG-2 standard and numerous variations are well known to those skilled in the art. As one skilled in the art will recognize, any number of variations of encoder 20 may be utilized within the scope of the present invention as claimed. FIG. 4 serves only to illustrate one example of an encoder 20.

2. Re-quantization

To reduce the data transmitted from encoder 20 to channel interface 24, a process known as quantization is applied to the coefficients created by DCT module 74 by quantizer 76 (see FIG. 4.). A coefficient is quantized by dividing it by a nonzero positive integer (the quantizer_scale) and rounding the quotient (the quantized coefficient), to the nearest integer. The larger the quantizer_scale, the lower the precision of the quantized coefficient. Lower precision quantized coefficients can be transmitted with fewer bits. This process allows encoder 20 to selectively discard activity that the human eye cannot readily perceive.

The present invention selects a re-quantization factor to precisely achieve the value of target_bit_rate. In other words, once the value of rate_reduction_factor has been determined, re-quantization is applied to reduce the size of a frame. The quantizer_scale in an MPEG-2 bit stream controls the output bit rate of the stream. By judiciously choosing which macroblocks are re-quantized (quantizer_scale is increased), the proposed method optimizes the video quality for the value of the rate_reduction_factor factor calculated earlier.

The following rules are used:
1. The new quantizer scale must be an integer multiple of the original quantizer scale. This is required to maintain alignment between decision thresholds of the original and new quantizer_scale, and achieves optimal rate-distortion performance. Decision thresholds are in essence a set of bins into which coefficients created by DCT module 74 are stored. If this rule is not adhered to, i.e., bins are misaligned, there can be a significant deterioration in both bit rate-and quality.
2. The bit rate of the frames coming from encoder 20 is inversely proportional to the value of quantizer_scale. This allows the present invention to maximize the potential for rate reduction by first targeting those macroblocks with the lowest quantizer_scale (therefore likely the highest bit rate). From a quality standpoint, this means that the lower quality blocks from the original stream are not further deteriorated until all other blocks having higher quality have been first targeted for rate reduction.

Using the above rules along with the distribution of the quantizer scale of all the macroblocks within a frame of the original stream, a quantizer multiplier is selected for each macroblock.

If rate_reduction_factor equals 100, no requantization is necessary and the part of the bit stream containing macroblock information for the current frame remains unchanged.

In MPEG-2, the value of quantizer_scale is coded for every macroblock in a frame using a five bit codeword quantizer_scale_code and a q_scale_type flag in the frame_coding_extension. The values of quantizer_scale_code and q_scale_type values are shown in Table 1. Quantizer_scale_tab represents the mapping of quantizer_scale_code to quantizer_scale as a function of q_scale_type.

TABLE 1

Values of quantizer_scale

| quantizer_scale_code | quantizer_scale_tab[q_scale_type][quantizer_scale_code] | |
|---|---|---|
| | q_scale_type = 0 | q_scale_type = 1 |
| 0 | (Forbidden) | |
| 1 | 2 | 1 |
| 2 | 4 | 2 |
| 3 | 6 | 3 |
| 4 | 8 | 4 |
| 5 | 10 | 5 |
| 6 | 12 | 6 |
| 7 | 14 | 7 |
| 8 | 16 | 8 |
| 9 | 18 | 10 |
| 10 | 20 | 12 |
| 11 | 22 | 14 |
| 12 | 24 | 16 |
| 13 | 26 | 18 |
| 14 | 28 | 20 |
| 15 | 30 | 22 |
| 16 | 32 | 24 |
| 17 | 34 | 28 |
| 18 | 36 | 32 |
| 19 | 38 | 36 |
| 20 | 40 | 40 |
| 21 | 42 | 44 |
| 22 | 44 | 48 |
| 23 | 46 | 52 |
| 24 | 48 | 56 |
| 25 | 50 | 64 |
| 26 | 52 | 72 |
| 27 | 54 | 80 |
| 28 | 56 | 88 |
| 29 | 58 | 96 |
| 30 | 60 | 104 |
| 31 | 62 | 112 |

The quantizer_scale_code of every macroblock is modified to achieve the required rate reduction. The following explains in detail the algorithm to determine the new quantizer_scale_code of the macroblocks in a frame.

First, the cumulative distribution function, cdf, of quantizer_scale_code of all macroblocks in a frame is computed. The cdf is reset to zero at the start of every frame. The value in mb_num is the number of macroblocks in a frame which varies with the resolution of the frame. Following is the pseudo-code for computing the cdf:

```
/* reset cdf to zero */
for (i=0; i < 32; i++) { cdf[i] = 0 };
/* compute cdf */
for (i=0; i<mb_num; i++)
{
    for (j = quantizer_scale_code[i]; j>0; j--)
    {
        cdf[j]++;
    }
}
```

The cdf of the macroblock quantizer_scale_code is used to determine which macroblocks will be targeted for rate reduction. The quantizer_multiplier is an integer, and the new quantizer_scale is obtained by multiplying quantizer_multiplier by quantizer_scale of the original macroblocks, which is available in stream 17. The value of quantizer_multiplier for each macroblock in a frame is selected to achieve the target rate reduction based on the inverse proportionality of the bit rate from encoder 20 and quantizer_scale. It is assumed that doubling quantizer_scale of a macroblock will reduce its number of bits by 50%, i.e. setting quantizer_multiplier to two will result in a 50% rate reduction for the macroblock considered. The quantizer_scale for macroblocks having the lowest quantizer_scale_code in the original stream are first multiplied with a quantization_multiplier of 2, followed by macroblocks having the next higher quantizer_scale until the target rate_reduction_factor is achieved. If all macroblock's quantizer scales have been multiplied and the target rate_reduction_factor is not achieved, the quantization multiplier is increased by one and the above procedure is repeated until the target rate_reduction_factor is achieved. Following is the pseudo-code for obtaining the new quantizer_scale_code for each macroblock in the frame, based on the cdf computed earlier:

```
/* initialize quantizer_multiplier */
for (i=0; i<mb_num; i++)
{
    quantizer_multiplier[i] = 1;
}
/* get the quantizer_scale from quantizer_scale_code */
for (i=0; i<mb_num; i++)
{
    quantizer_scale[i] = quantizer_scale_tab
        [q_scale_type] [quantizer_scale_code[i]];
}
/* obtain the quantizer_multiplier. */
original_rate_reduction_factor = rate_reduction_factor;
k = 2;
while(rate_reduction_factor < 100)
{
    for (i=0; i<mb_num; i++)
    {
        /* cdf_max is the maximum value of cdf at which
           rate reduction is no longer necessary, i.e.
           macroblocks having a higher
           quantizer_scale_code than that of cdf_max do
           not get their quantizer_multiplier
           incremented
        */
        cdf_max = ((rate_reduction_factor –
            50)*2*mb_num)/100;
        for (j=31; j>0; j--)
        {
            if (cdf[j] >= cdf_max)
            {
                if (quantizer_scale_code[i] <= j)
                {
                    quantizer_multiplier[i]++;
                }
                /* get out of the for loop */
                break;
            }
        }
    }
    rate_reduction_factor =
        original_rate_reduction_factor * k;
    k++
}
/* set the new quantizer_scale_code */
for (i=0; i<mb_num; i++)
{
    quantizer_scale[i] *= quantizer_multiplier[i];
    /* make sure quantizer_scale is less that the
       maximum value allowable according to Table 1.
    */
    if (quantizer_scale[i] >
        quantizer_scale_tab[q_scale_type] [31])
    {
        quantizer_scale[i]=
            quantizer_scale_tab[q_scale_type] [31]
    }
    /* quantizer_scale_inv is the inverse mapping of
       quantizer_scale_tab.
    */
    quantizer_scale_code[i] =
        quantizer_scale_inv
            [q_scale_type] [quantizer_scale];
}
```

After the new quantizer_scale_code is obtained, at step 76 of FIG. 4, MPEG-2 encoding continues as described above with regard to FIG. 4.

To further describe the process of calculating the various values utilized to optimize target_bit_rate, we now refer to FIGS. 5 through 8.

Figure 5:
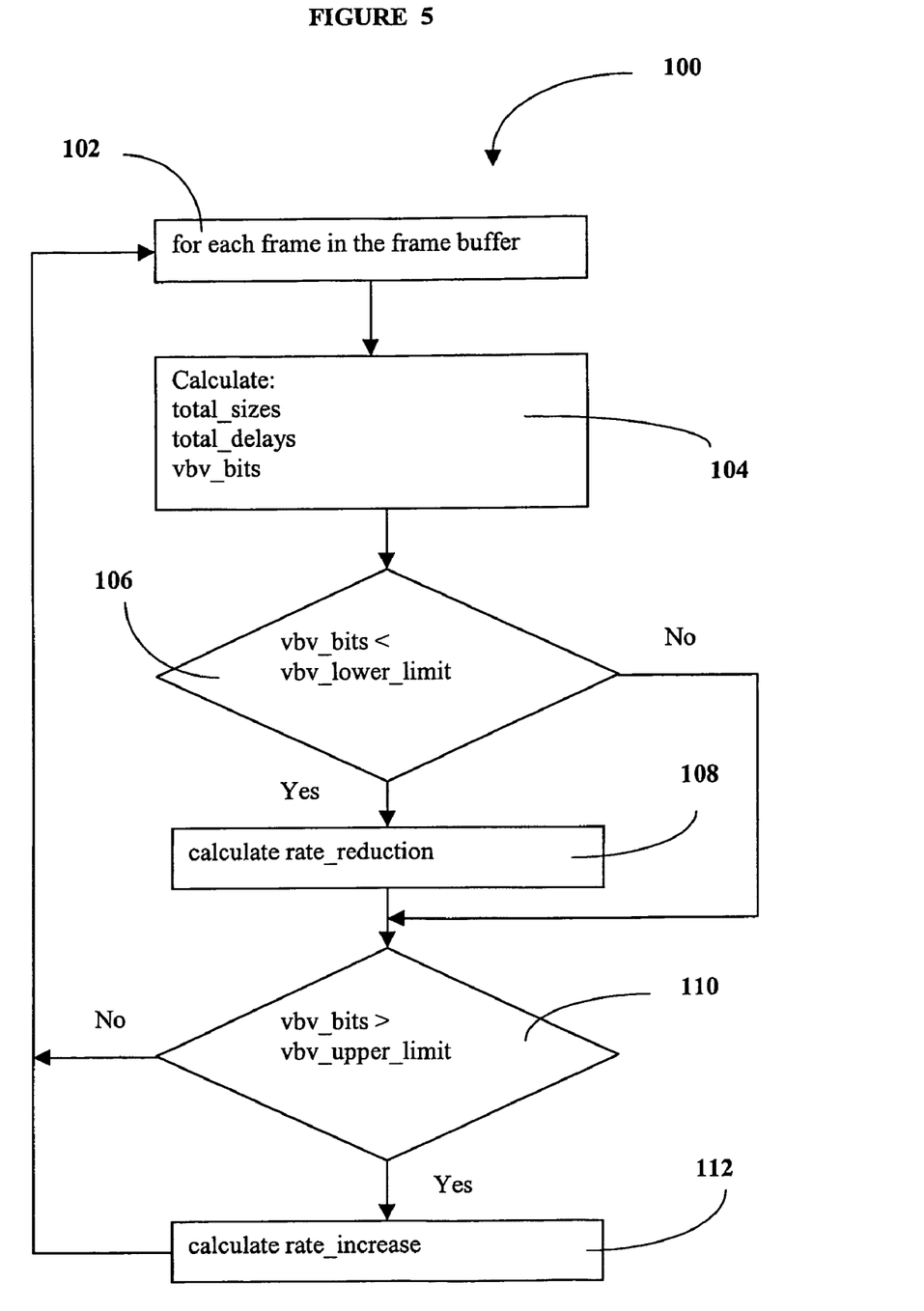
FIG. 5, is a flowchart of the process for calculating rate_reduction_factor nd rate_increase.

Referring now to FIG. 5, a flowchart of the process for calculating rate_reduction_factor and rate_increase is shown generally as 100. Beginning at step 102 for each frame in the frame buffer 18, the values of total_sizes, total_delays and vbv_bits are calculated at step 104. At step 106, if the value of vbv_bits is less than vbv_lower_limit, process 100 moves to step 108 where a new value of rate_reduction_factor is calculated. Otherwise, step 106 moves directly to step 110. At step 110, if the value of vbv_bits is greater than vbv_upper_limit then a new value of rate_increase is calculated at step 112. Otherwise, processing returns to step 102 until all frames in frame buffer 18 have been examined.

Figure 6:
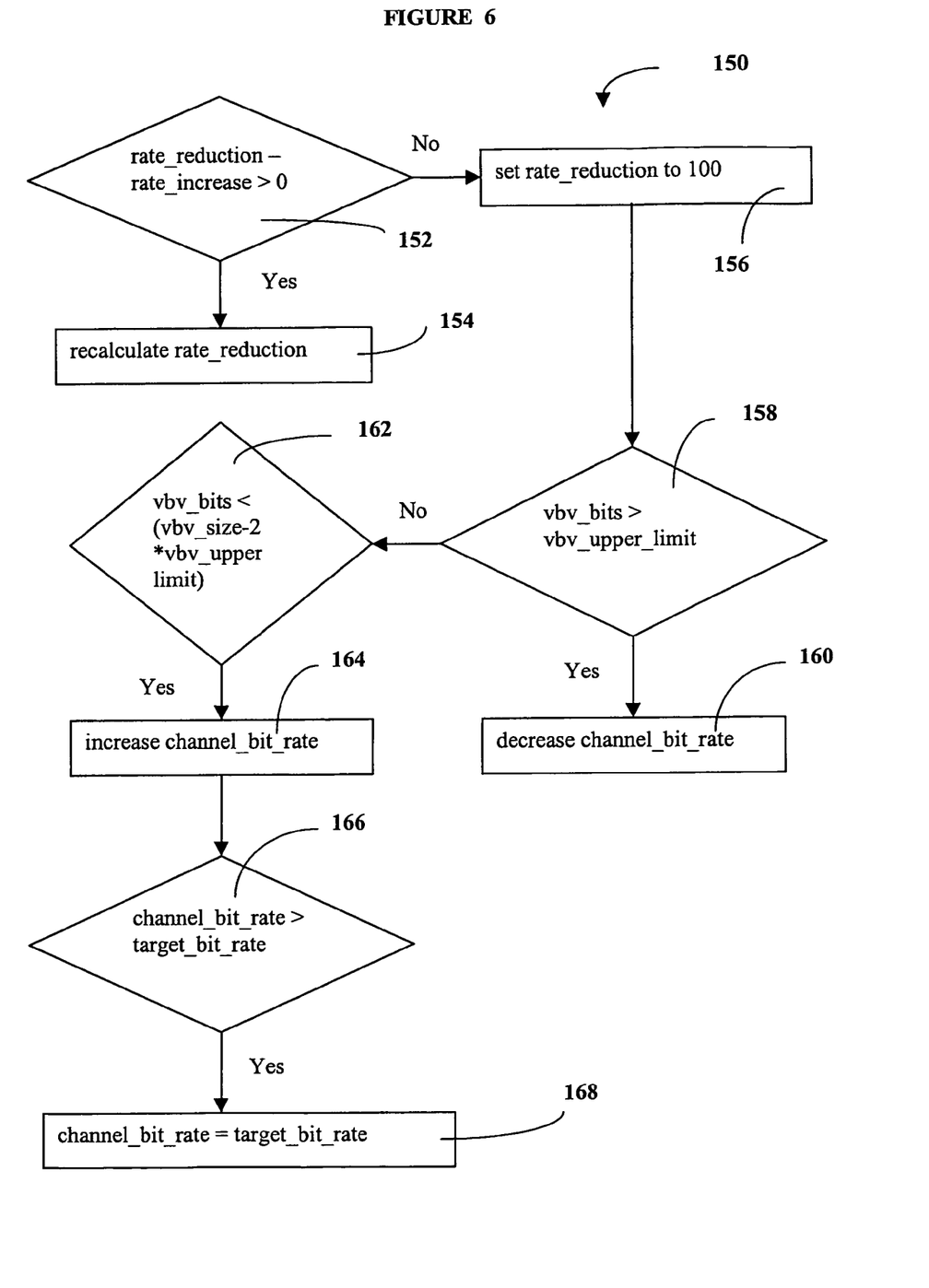
FIG. 6, is a flowchart of the process for calculating the final value for ate_reduction_factor and channel_bit_rate.

Referring now to FIG. 6, a flowchart of the process for calculating the final value for rate_reduction_factor and channel_bit_rate is shown generally as 150. Beginning at step 152 if the value of rate_reduction_factor minus the value of rate_increase is greater than zero, then the value of rate_reduction_factor is set to one hundred minus rate_reduction_factor plus rate_increase at step 154 and process 150 ends. Otherwise process 150 moves to step 156 where rate_reduction_factor is set to the value of one hundred. At step 158 if the value of vbv_bits is greater than vbv_upper_limit than process 150 moves to step 160 where channel_bit_rate is decreased and process 150 ends. Otherwise, process 150 moves to step 162 where another test is made to determine if channel_bit_rate should be increased. If it does not need to be than process 150 ends. At step 164 channel_bit_rate is increased and at step 166 a test is made to determine if channel_bit_rate should assigned the value of target_bit_rate. If this is the case the assignment is made at step 168.

Figure 7:
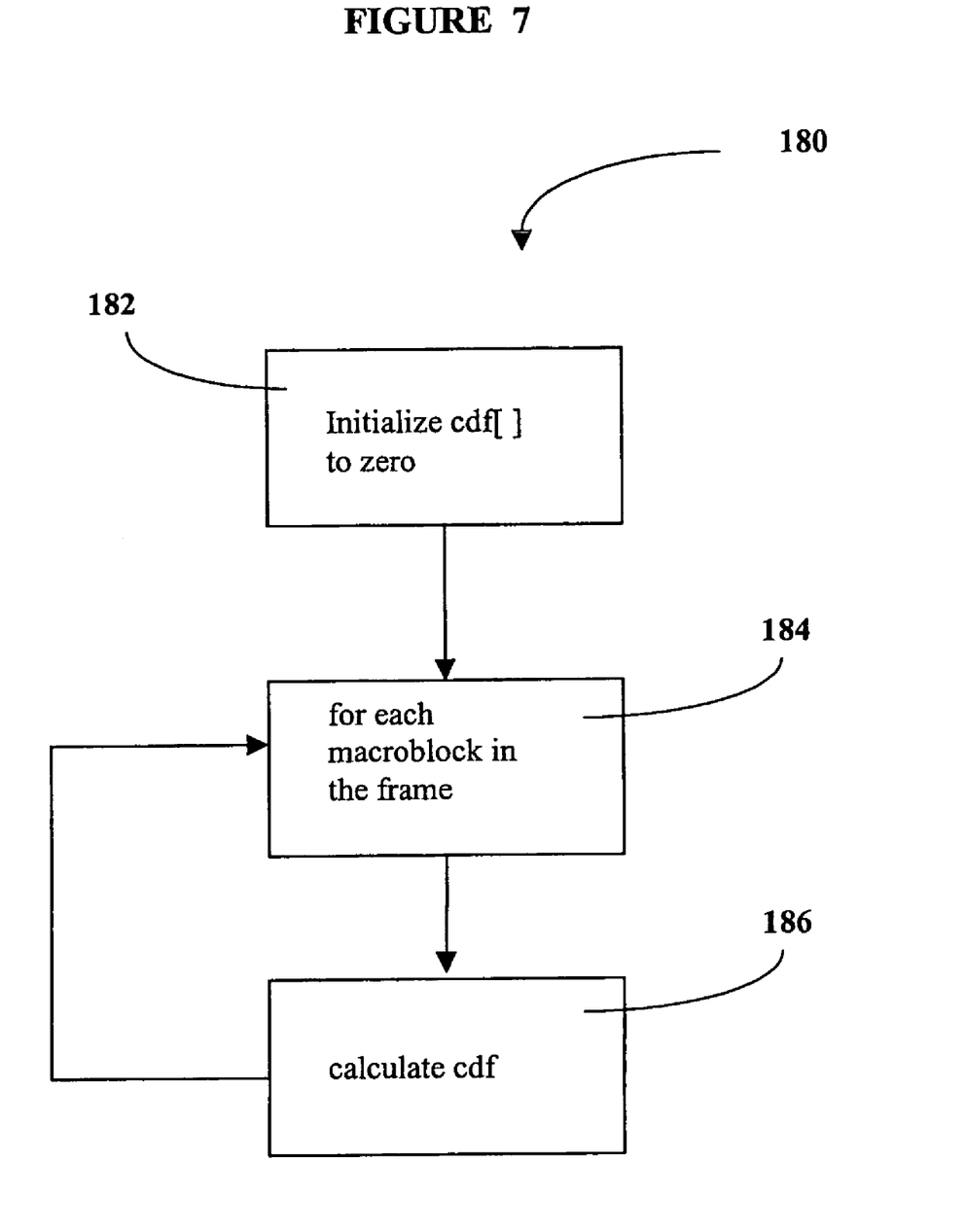
FIG. 7, is a flowchart of the process for computing a cumulative distribution function of the quantizer_scale_code for each macroblock in a frame.

Referring now to FIG. 7, a flowchart for the process of computing a cumulative distribution function (cdf) of the quantizer_scale_code for each macroblock in a frame is shown generally as 180. Beginning at step 182, each element of an array holding the cdf values is set to zero. At step 184 a loop is invoked so that a cdf value is calculated for each macroblock in the current frame, i.e. the one about to be encoded by encoder 20 (see FIG. 1). At step 186 the cdf for the macroblock is calculated. Process 180 ends when steps 184 and 186 have processed all macroblocks.

Figure 8:
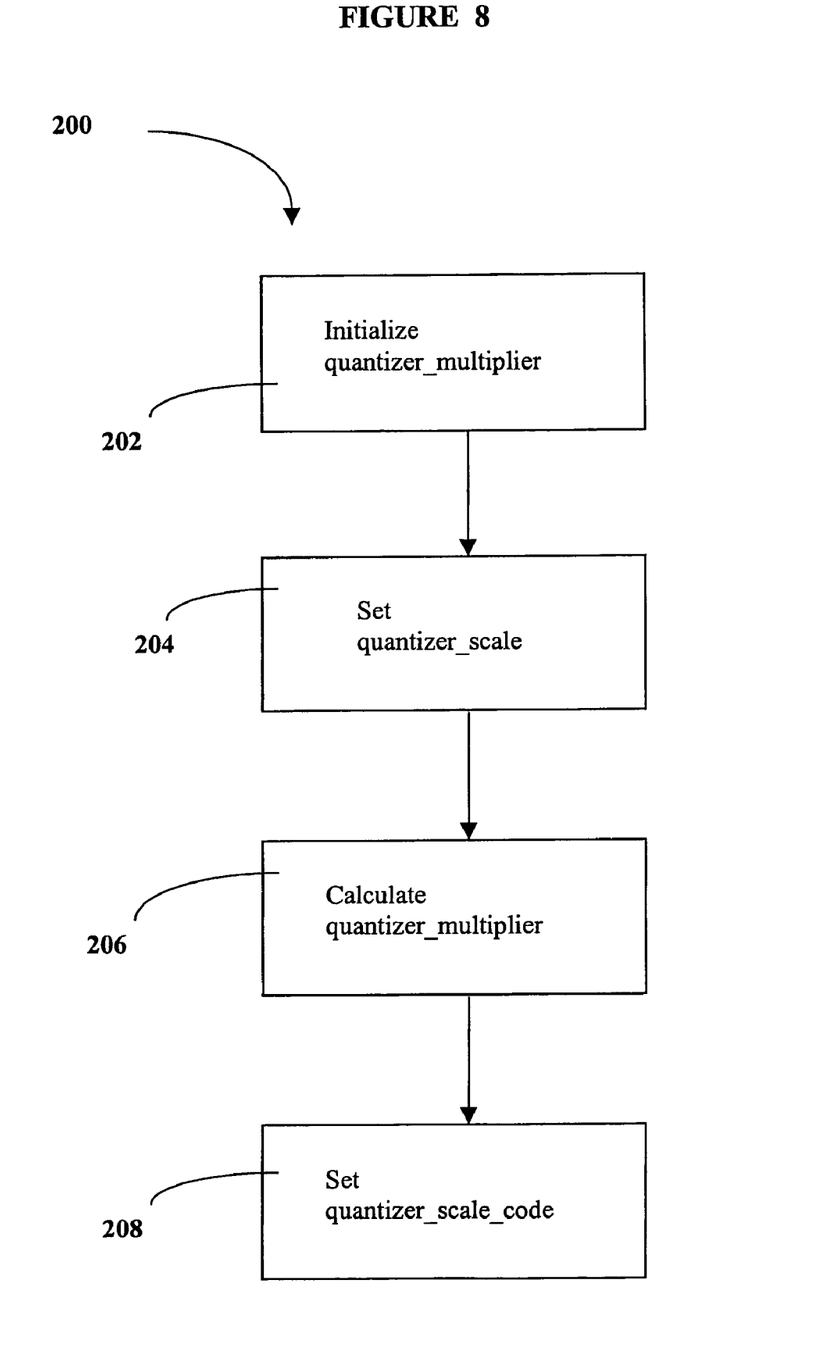
FIG. 8, is a flowchart of the process for computing a quantizer_multiplier and quantizer_scale for each macroblock in a frame.

Referring now to FIG. 8, a flowchart for the process of computing a quantizer_multiplier and quantizer_scale for each macroblock in a frame is shown generally as 200. Beginning at step 202, the value of the quantizer_multiplier for each macroblock in the current frame is set to the value of one. Moving to step 204, the value of quantizer_scale for each macroblock in the current frame is set to the value provided with the original transmission of the macroblock. At step 206, the value of quantizer_multiplier for each macroblock in the current frame is calculated. As mentioned earlier, macroblocks having a higher quantizer_scale_code than that of the value in cdf_max do not have their quantizer_multiplier incremented. At step 208, the quantizer_scale_code for each macroblock is set by utilizing the array quantizer_scale_inv[ ] to obtain quantizer_scale_code based upon quantizer_scale.

Although the invention has been described with reference to certain specific embodiments, various modifications thereof will be apparent to those skilled in the art without departing from the spirit and scope of the invention as outlined in the claims appended hereto.

We claim:

1. A method of controlling the rate of an MPEG video stream to achieve a target bit rate, said method comprising the steps of:
   computing a rate reduction factor, wherein computing the rate reduction factor includes
      i) setting said rate reduction factor to and a rate increase variable to 0,
      ii) adding the size of a current frame in a frame buffer to a total size variable,
      iii) adding the duration of the current frame to a total delays variable,
      iv) calculating a current value of the number of bits in a vbv buffer,
      v) if the current value of the number of bits in the vbv buffer is less than the lower threshold, increasing said rate reduction factor,
      vi) if the current value of the number of bits in the vbv buffer is greater than the upper threshold, increasing said rate increase variable, and
      vii) repeating steps ii) to vi) for a plurality of frames in a said frame buffer;
   b) computing a quantizer scale;
   c) applying the results of steps a) and b) to the encoder to achieve said target bit rate; and
   d) repeating steps a) to c) for a plurality of frames in said video stream.

2. The method of claim 1 wherein step a) further comprises the steps of:
   viii) calculating a rate reduction factor for the current frame if needed, otherwise setting a value for a channel bit rate.

3. The method of claim 1 wherein step b) further comprises the steps of:
   i) calculating a cumulative distribution function for each macroblock in a current frame;
   ii) initializing a quantizer multiplier array;
   iii) setting the quantizer scale for each macroblock in the current fire;
   iv) calculating a quantizer multiply for each macroblock in the current frame; and
   vi) setting a quantizer scale code for each macroblock in the current frame.

4. A computer readable medium encoded with a computer program including instructions for controlling the rate of an MPEG video stream to achieve a target bit rate, said instructions comprising, when executed by a processing device, the steps of:
   a) computing a rate reduction factor, wherein computing the rate reduction factor includes
      i) setting said rate reduction factor and a rate increase variable to 0,
      ii) adding the size of a current frame in a frame buffer to a total size variable,
      iii) adding the duration of said current frame to a total delays variable,
      iv) calculating a current value of the number of bits in a vbv buffer,
      v) if the current value of the number of bits in the vbv buffer is less than the lower threshold, increasing said rate reduction factor,
      vi) if the current value of the number of bits in the vbv buffer is greater than the upper threshold, increasing said rate increase variable, and
      vii) repeating steps ii) to vi) for a plurality of frames in said frame buffer,
   b) computing a quantizer scale;
   c) applying the results of steps a) and b) to the encoder to achieve said target bit rate: and
   repeating steps a) to c) for a plurality of frames in said video stream.

5. The medium of claim 4 wherein step a) further comprises the step of:
   viii) calculating a rate reduction actor for said current frame if needed, otherwise setting a value for a channel bit rate.

6. A computer readable medium encoded with a computer program including instructions for controlling the rate of an MPEG video stream to achieve a target bit rate, said instructions comprising, when executed by a processing device, the steps of:
   a) computing a rate reduction factor;
   b) computing a quantizer scale, wherein computing said quantizer scale comprises:
      i) calculating a cumulative distribution function for each macroblock in a current frame,
      ii) initializing a quantizer multiplier array,
      iii) setting the quantizer scale for each macroblock in a current frame,
      iv) calculating a quantizer multiply for each macroblock in the current frame, and
      v) setting a quantizer scale code for each macroblock in the current frame, and,
   c) applying the results of steps a) and b) to an encoder to achieve said target bit rate; and
   repeating steps a) to c) for a plurality of frames in said video stream.

7. A system for controlling the rate of an MPEG video stream to achieve a target bit rate, said system comprising:
   a) means for computing a rate reduction factor, wherein the means for computing the rate reduction factor includes i) means for setting said rate reduction factor and a rate increase variable to 0, ii) means for adding the size of a current frame in a frame buffer to a total size variable, iii) means for adding the duration of the current frame to a total delays variable, iv) means for calculating a current value of the number of bits in a vbv buffer, v) means for increasing said rate reduction factor if the current value of the number of bits in the vbv buffer is less than the lower threshold, and vi) means for increasing said rate increase variable if the current value of the number of bits in the vbv buffer is greater than the upper threshold;

b) means for computing a quantizer scale;

c) means for applying the results of steps a) and b) to the encoder to achieve said target bit rate; and repeating steps a) to c) for a plurality of frames in said video steam.

8. The system of claim 7 wherein said means for computing a rate reduction factor further comprises:

vii) means for calculating a rate reduction factor for said current frame if needed, otherwise setting a value for a channel bit rate.

9. A system for controlling the rate of an MPEG video steam to achieve a target bit rate, said system comprising:

a) means for computing a rate reduction factor;

b) means for computing a quantizer scale, wherein said means for computing a quantizer scale comprises:

i) means for calculating a cumulative distribution function for each macroblock in a current frame, ii) means for initializing a quantizer multiplier array, iii) means for setting the quantizer scale for each macroblock in the current frame, iv) means for calculating a quantizer multiply for each macroblock in the current frame, and v) means for setting a quantizer scale code for each macroblock in the current frame;

c) means for applying the results of steps a) and b) to an encoder to achieve said target bit rate.

* * * * *